Patented Jan. 27, 1953

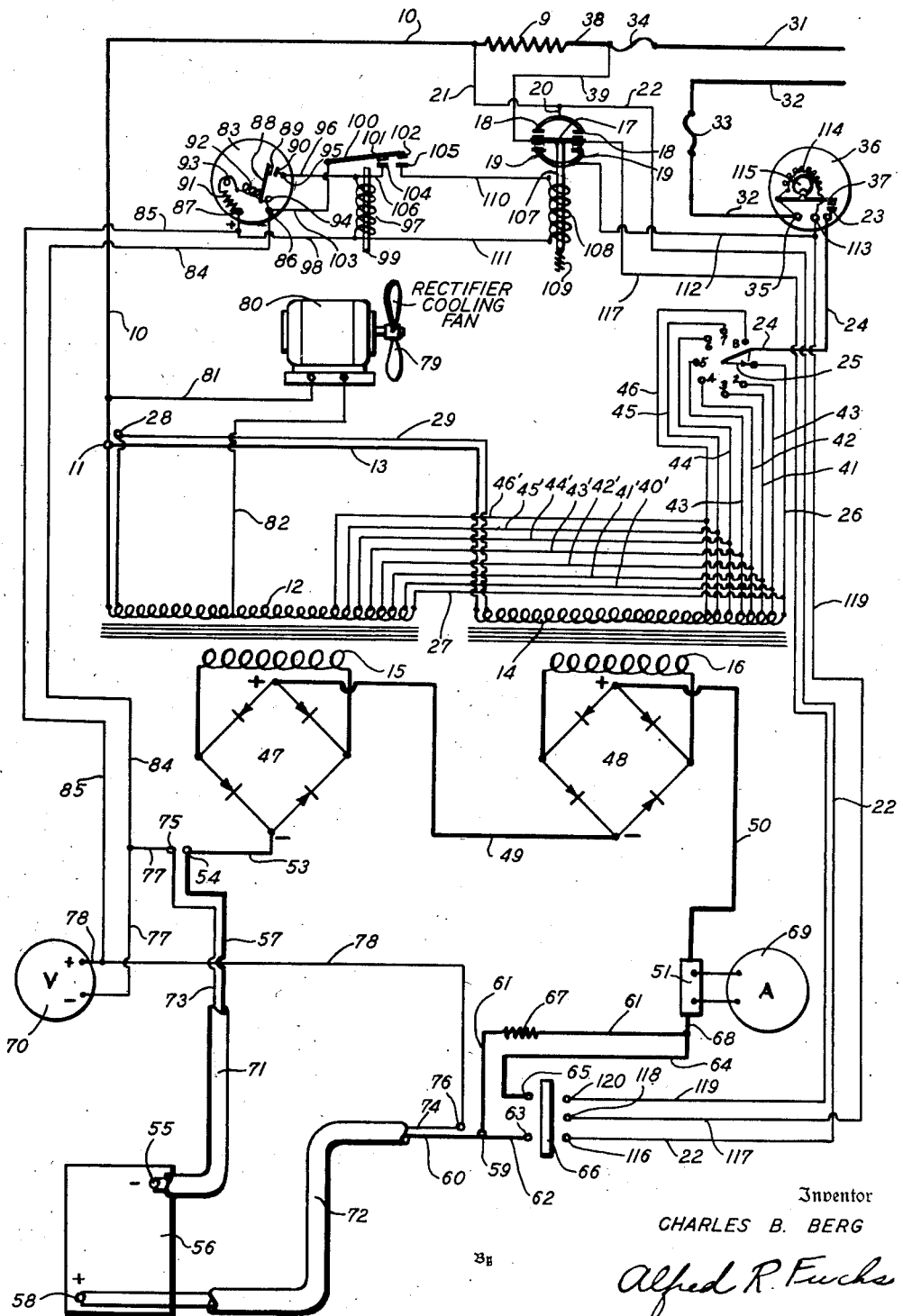

2,627,060

UNITED STATES PATENT OFFICE 2,627,060

CONTROLLING MEANS FOR BATTERY CHARGERS

Charles B. Berg, Kansas City, Mo.

Application December 23, 1947, Serial No. 793,421

4 Claims. (Cl. 320—23)

My invention relates to controlling means for battery chargers, and more particularly to controlling means for chargers for heavy duty batteries.

My invention particularly relates to chargers for industrial type heavy duty batteries, either lead or Edison type batteries. Due to the service that industrial type batteries are required to give, the charger used for such batteries must be as nearly automatic as possible and is therefore designed to start at a relatively high rate of charge and continue at that rate, with a certain amount of taper, until the battery reaches the gassing stage, which occurs when the voltage reaches 2.37 volts per cell, or 14.22 volts for a battery comprising six lead cells.

Most of the charging can be accomplished at the high charging rate, before the battery reaches the gassing stage. Bringing the battery to the gassing voltage requires an amount of time dependent on the state of charge of the battery. My apparatus is particularly designed to control the charging so that the low charging rate is commenced exactly when the voltage for the six cell battery reaches 14.22 volts, and accordingly for a given charging rate the time required to complete the charge of the battery from that point on will always be approximately the same, and means is provided for controlling the time interval of such low rate charging by means of a timer, which is set in operation when the controlling means operates to start the low charging rate for the charger.

In order that a voltage control system will be effective on a battery charger that is provided with means for charging first at a high rate and then at a low rate, the controlling means accomplishing the switch-over from the high rate to the low rate of charge, the control system must not be affected by variations in ambient, charger internal, or individual part temperature, and particularly must be extremely accurate and dependable, easy to adjust or service and reasonably well protected from dust and dirt.

It is a particular purpose of my invention to provide a control system for charging apparatus that meets the above requirements. This is accomplished by providing a voltmeter type relay, in which a moving contact is substituted for the usual meter pointer, and a fixed contact arranged for engagement by the movable contact when a given voltage is reached. In order to increase the accuracy of the relay, the voltmeter is of the suppressed zero type so that the pointer lies at rest at a reading of twelve volts and the contacts engage at 14.22 volts. Thus the voltmeter between the two limits of its movement is of the accuracy of a millivoltmeter.

It is a further purpose of my invention to provide in a control system of the above mentioned character, means for operating the switching means in the form of a relay that operates to insert a resistance in the primary circuit of the charging apparatus, which switching means operating relay is controlled by a small high resistance actuating and locking relay that is actuated by such a small current that the contacts and operating parts of the voltmeter of the above mentioned character will not be in any manner damaged by the current flow through the same.

It is a further purpose of my invention to provide controlling means of the above mentioned character, that, at the time the relay, that controls the insertion of the resistance, is actuated to insert said resistance in the primary circuit, also starts the operation of a timer which controls the length of time of low rate charging to open the charging circuit completely after the timer has operated through a definite time interval, said timer being used in conjunction with a charging rate control switch that has been preset for a desired rate of charge.

In order to assure the accuracy of the controlling apparatus, it is necessary in a controlling system that is as accurate and sensitive as that forming the subject matter of this invention, that the leads from the battery to the voltmeter that forms the essential part of the controlling mechanism be carried directly from the voltage source, that is, the battery terminals, to the actuating voltmeter, or voltmeter relay, and not through the current carrying wires. Accordingly the voltmeter leads are built into the charging cable and the actual battery voltage is read on the voltmeter that controls the operation of the charger as well as on the voltmeter that is on the instrument panel. This avoids the difficulty that would exist where the usual system is used, in which the voltage is picked up from the charger end of the charging cables, in which case the resistance of the charging cables varies according to the charging rate in current and thus results in some error in the voltage readings, not giving the true voltage at the battery terminals, which would affect the controlling device so that the high rate would not be terminated at the proper voltage.

It is a further purpose of my invention to provide means whereby Edison batteries can be charged by the apparatus forming the subject matter of this invention, but inasmuch as Edison batteries require a modified current for charging and do not require that the rate be reduced until the charge is complete, means is provided for adapting the charging apparatus for use for charging Edison batteries by providing means for cutting the voltage control system entirely out of the circuit when using the charger for Edison batteries. By Edison type batteries is meant a nickel iron electrode battery using an alkaline electrolyte.

When used with Edison batteries the timer must be set differently. For lead batteries the timer will be set for three or four hours at the low rate charging, the three or four hour time interval starting when the low rate charging begins, but with Edison batteries the timer is started when the charger is turned on and is set for a period of from six to eight hours, depending upon the rate of charge, the timer utilized being of a type that can be adjusted to the desired extent.

Other objects and advantages of my invention will appear as the description of the drawing proceeds. I desire to have it understood, however, that I do not intend to limit myself to the particular details shown or described, except as defined in the claims.

In the drawing the figure is a circuit diagram of a charging apparatus embodying my improved controlling means.

Referring in detail to the drawing, the line wires 31 and 32 from an alternating current source, supply the electrical energy for the charger, the usual fuses 33 and 34 being provided in said line wires. The line wire 32 leads to a terminal 35 on a timer 36, which is connected with the movable contact member 37 of the timer, while the line wire 31 has the branches 38 and 39, the branch 38 leading to the low voltage rate resistor 9, which is connected with the lead 10 that extends to the terminal 11 connected with one end of the primary winding 12. A conductor 13 also extends from the terminal 11 to a primary winding 14 of a second transformer. The transformer having the primary winding 12 is provided with a secondary winding 15 and the transformer having the primary winding 14 is provided with a secondary winding 16, the two transformers being duplicates in construction.

The conductor 39 extends to a switching means which has a movable contact member 17, which has contacts thereon that are adapted to engage with either the stationary contacts 18 or the stationary contacts 19, resilient means being provided for normally holding the contacts on the movable contact member 17 in engagement with the stationary contacts 18, which are connected with a conductor 20, from which lead the conductors 21 and 22. The conductor 21 is connected with the conductor 10 and thus provides a shunt connection around the resistance 9. The position with the movable contact member in engagement with the contacts 18 is that of the switching means when the charger is operating at a high charging rate.

The timer 36 operates to separate the movable contact 37 from a cooperating stationary contact 23 after the time interval has expired for which the timer was set. However, when the timer is first set for the desired time interval, the contact 37 is in engagement with the contact 23 and thus the line wire 32 will be connected through the time switch with the conductor 24, which leads to the rate control switch having a movable contact member 25 that is adapted to be engaged with one of a plurality of contacts numbered 1 to 8, inclusive, the movable contact member 25 being connected with the conductor 24. The contact numbered 1 is connected to a conductor 26 with the opposite end of the primary winding 14 to that with which the conductor 13 is connected, and the conductor 27 connects the conductor 26 with the primary winding 12 on the opposite end thereof from that connected with the terminal 11. A second terminal 28 is provided, which is connected with the primary winding 12 a predetermined number of turns from the end thereof connected with the terminal 11, and a conductor 29 extends from the terminal 28 to a corresponding point on the primary winding 14, the terminal 28 being provided as an alternative connection for the conductor 10 in case the line voltage is lower than the normal voltage for which the transformer is designed, or in case the rectifiers have deteriorated due to age.

The contacts numbered 2, 3, 4, 5, 6, 7 and 8 are connected, respectively, with taps 40, 41, 42, 43, 44, 45 and 46 leading to uniformly spaced points on the primary winding 14, and are similarly connected with the primary winding 12 through conductors 40′, 41′, 42′, 43′, 44′, 45′ and 46′ leading from the conductors 40, 41, 42, 43, 44, 45 and 46, respectively.

The secondary winding 15 is the current supply for the rectifier 47 and the secondary winding 16 is the current supply for the rectifier 48. The rectifiers 47 and 48 are connected in series, the conductor 49 connecting the positive terminal of the rectifier 47 with the negative terminal of the rectifier 48. The positive terminal of the rectifier 48 is connected with a conductor 50 that leads to an ammeter shunt 51 for the ammeter 69 and the conductor 53 extends from the negative terminal of the rectifier 47 to a terminal 54. The terminal 54 is connected with the negative terminal 55 of the battery 56 that is being charged by means of a charging cable 57, and the positive terminal 58 of said battery is connected with a terminal 59 by means of the charging cable 60.

The conductors 61 and 62 extend from the terminal 59, the conductor 62 extending to a contact 63 and a conductor 64 extending from a contact 65, which contacts are adapted to be bridged by a conducting bar 66 so as to short circuit the resistance 67 provided in the conductor 61, the conductors 61 and 64 being connected with a common conductor 68 that is connected with the shunt 51, thus connecting the positive terminal of the battery being charged with the conductor 50 leading from the positive terminal of the rectifier 48.

The conducting bar 66 is clamped in position on the contacts 63 and 65 when a lead battery is being charged. Accordingly, with the movable switching member 17 in engagement with the contacts 18 the battery 56 will be charged at a rapid rate from the line wires 31 and 32 through the primary circuit including the conductors 39, 21, 10, 24, and the tap selected by the adjustment of the rate control switch by movement of the movable contact member 25 thereof, the secondary circuit comprising the secondaries of the transformers, the rectifiers 47 and 48, and the conductors 50, 57, 64, 62 and 60 leading to the terminals of the battery being charged.

The charging apparatus is provided with an ammeter 69, which is connected with the shunt 51 in the usual manner, and with a voltmeter 70, both being provided on the instrument panel of the apparatus. The cable conductors 57 and 60 extending from the terminals of the battery are mounted in cables 71 and 72, which also have conductors 73 and 74 mounted therein and insulated from the conductors 57 and 60. The conductors 73 and 74 lead to terminals 75 and 76, from which the conductors 77 and 78 extend to the voltmeter 70.

A fan 79 is also provided for cooling the rectifier, which is provided with a motor 80 that is connected with the conductor 10 by means of a conductor 81 and with the primary winding 12 by means of a conductor 82 that is tapped off the primary winding 12 at a predetermined point from the end thereof connected with the terminal 11. Due to the arrangement of connections 81 and 82 leading to the fan motor 80, the operating voltage of the fan motor 80 will vary in accordance with whatever portion of the primary winding is in use, dependent upon the position of the movable contact member 25 of the rate control switch. Thus as the switch 25 is moved around its axis of rotation from the contact numbered 1 toward the contact numbered 8, the charging rate will increase inasmuch as the primary windings will be reduced relative to the secondary windings. At the same time the number of turns of the primary winding 12 lying between the end thereof and the conductor 82 will increase relative to the total number of turns connected with the line wires 31 and 32 and thus the voltage supplied to the motor 80 will increase and the fan 79 will speed up, thus increasing the cooling effect of the fan in proportion to the heating effect of the rectifiers as the charging rate is increased.

My improved controlling system for charging apparatus of the above described character for shifting from high rate of charge to low rate of charge at the proper time, comprises a voltmeter 83, which is connected with the terminals 75 and 76 by means of the conductors 84 and 85, which are shown in the circuit diagram as being connected with the conductors 77 and 78, respectively, but which may be connected directly with the terminals 75 and 76 in practice. The conductors 73, 77 and 84 provide a direct connection between the battery terminal 55 and the terminal 86 on the voltmeter 83, which is of substantially constant resistance, not being in any manner affected by variation in the resistance of the leads from the charging apparatus due to the charging operation. Similarly the terminal 58 of the battery is connected directly with the terminal 87 of the voltmeter 83 through the conductors 74, 78 and 85.

The voltmeter comprises a movable arm 88, which usually acts as a pointer, but which in the present case serves as a movable contact member having a contact 89 provided thereon that is adapted to engage a stationary contact 90, the position of which is adjustable in any well known manner to provide for the engagement of the contacts 89 and 90 at the exact voltage desired. The voltmeter is provided with the usual series resistance 91 and with the armature 92 that operates to move the pivotally mounted arm 88, the rear hair spring 93 and front hair spring 94 usually provided serving as conductors connecting the armature 92 with the terminal 87 through the high resistance 91 and with the terminal 86, respectively.

The voltmeter 83 is of the suppressed zero type, the hair springs and armature being so designed that the armature does not move until at least a voltage of twelve volts is reached. Then as the voltage is increased the movable member 88, which is of conducting material and electrically connected with one end of the armature, will move toward the right or clockwise as shown in the circuit diagram toward the contact 90, the voltmeter 83 being so calibrated that the contact 89 will engage the contact 90 when the voltage between the terminals 87 and 86 is exactly 14.2. The hair spring 94 is adjustable in the usual manner and this adjustment as well as the adjustment of the contact 90 provides a limited adjustment so that if there is any slight variation from the desired voltage of 14.2 volts, at the time that the contacts 89 and 90 engage, the instrument can be adjusted so as to obtain engagement of said contacts exactly at said desired voltage.

As the range of the instrument is less than two and one half volts, it will serve as a very accurate relay. It is designed with heavy hair springs and with a considerable amount of damping so that there is no excess swing or bounce of the movable element 88.

Since, in the voltmeter type of relay 83 provided in my controlling system, the current that flows through the pointer arm 88 must flow through the hair spring 94, the current flowing through the contacts 89 and 90 must be kept at a very low value, as will be explained below, in operation the current flow through the contacts 89 and 90 will be only from two and one half to three milliamperes at a pressure of twelve volts. The engagement of the contacts 89 and 90 operates a relay, which, in view of the fact that such a low pressure and low amperage is necessary in order to not injure the operating mechanism of the voltmeter 83, is a very sensitive one having a very high resistance winding.

The contact 90 is electrically connected with the terminal 95, from which a conductor 96 extends to the high resistance relay winding 97, the resistance of which is 3,000 ohms, a conductor 98 extending to the other end of the winding 97 from the conductor 85. The relay is provided with a core 99 that attracts the pivoted armature 100, which is of conducting material and which has the contacts 101 and 102 provided thereon. A conductor 103 connects the terminal 86 with the armature 100 and the contacts 101 and 102 engage the contacts 104 and 105 when the armature is attracted by energization of the winding 97. A conductor 106 connects the contact 104 with the same end of the winding 97 with which the conductor 96 is connected.

Accordingly when the armature is attracted by the energization of the winding 97 the contacts 101 and 104 will engage to complete a circuit from the terminals 86 and 87 and thus from the battery to the winding 97, which will maintain the armature attracted so as to keep the contacts 101 and 104, and the contacts 102 and 105 in engagement, even though the contact 89 should leave the contact 90. This is highly desirable because, when the low charging rate is started, which takes place, as will be explained below, when the armature 100 is attracted, the voltage at the battery terminals is reduced and the moving element 88 of the voltmeter relay will back away from its position in which the contacts 89 and 90 were in engagement. This backing away of the movable member can thus be accomplished without any resulting chattering or vibrating due to the fact the high resistance winding 97 will be drawing its operating current through the conductor 103, which short circuits the circuit through the contacts 89 and 90 and thus the operating current for the relay will be drawn directly from the battery terminals and will not pass through the voltmeter 83. Of course, the operating current for the voltmeter will still pass through the meter in the usual manner, but because of the interposition of the high resistance 91 the low resistance conducting path through the conductors 101 and 98 will be that supplying the winding 97.

The movable contact member 17 of the switching means is mounted on a plunger 107, which is of soft iron, and which moves into the winding 108 when the same is energized to move the switching element 17 into position so that the contacts thereon will engage the contacts 19, a spring 109 being provided for holding the movable switching member 17 in position so that the contacts thereon engage the contacts 18 when the winding 108 is not enegized. A conductor 110 extends from the contact 105 to one end of the winding 108 and a conductor 111 extends from the conductor 98 to the winding 109. When the armature 100 is attracted by the winding 97 to engage the contact 102 with the contact 105, the winding 108 will be energized due to the fact that the same is connected with the battery terminals through the conductors leading to the terminals 86 and 87 from the battery, the winding 108 being connected with the terminal 86 through the conductor 103, the armature 100, the contacts 102 and 105 and the conductor 110, and with the terminal 87 through the conductors 98 and 111. Accordingly as long as the armature 100 is being attracted, the winding 108 will be energized and the movable switching member 17 will be in position with its contacts in engagement with the contacts 19. The resistance of the winding 108 is relatively low, usually between 100 and 250 ohms.

With the switching element 17 in this position the conductor 39 will be disconnected from the conductor 20 and the conductor 21, and accordingly the circuit from the line conductor 31 to one side of the transformer will be through the resistance 9, thus reducing the rate of charge to the low rate determined by the amount of resistance contained in the resistor 9. At the same time that the resistance 9 is thrown into the primary circuit, a circuit is established through the conductor 112 from the conductor 39 through the contacts 19 to a terminal 113 on the time switch 36 and through the timing motor winding 114 to the terminal 35, which is connected with the line wire 32. Preferably, the resistance 9 is of about 14 ohms (for a 220 volt supply).

The timing motor is thus set in operation, it having been pre-set at the time the charging operation was started for a predetermined time interval, the movable contact member 25 of the charging rate switch also being pre-set at the start of the charging operation. Charging will then continue at the low rate as long as the timing switch motor does not move the contact 37 out of engagement with the contact 23. This is ordinarily accomplished by means of a cam 115, that is driven by the timing motor so as to rotate to a position such that it will permit the contact 37 to move away from the contact 23 when the low point of the cam reaches the position shown in the circuit diagram, the switching element having the contact 37 having a normal tendency to move away from the contact 23 and being held in engagement therewith by the cam 115 until said low point is reached. The timing mechanism is usually set to operate for several hours after the switching element 17 has moved with its contacts into engagement with the contacts 19. When the separation of the contacts 23 and 37 takes place, the primary circuit to the transformers is interrupted and charging is ended. The relay 97, however, does not release the armature 100 until the circuit between the battery and the conductors 73 and 74 is broken.

It will be noted that a conductor 22 extends from the conductor 20 to a terminal 116 and that a conductor 117 extends from the switching element 17 to a terminal 118, and a conductor 119 extends from the conductor 112 and thus from the terminal 113 on the time switch 36 to the terminal 120. When the conducting bus bar 66 is removed from its bridging relation to the terminals 63 and 65 and bridged across the contacts or terminals 116, 118 and 120, the timer will be adjusted for use for charging Edison batteries. When this takes place the resistance 67 will be interposed in the rectifier output circuit between one terminal of the battery and one of the rectifier terminals. At the same time the switching element 17 will have no effect on the operation of the charging apparatus, as it will be short circuited by the conducting bar 66, which connects the conductors 22 and 117, as well as the conductors 119 and thus 112 with each other.

Accordingly, no matter what the position of the switching element 17, the conductor 39 will be connected with the conductor 21 either through the conductor 20 or through the conductors 117, the bar 66 and the conductor 22, the resistance 9 being thus short circuited and the resistance 67 in the secondary circuit determining the charging rate along with the position of the movable contact member 25 on the charging rate control switch. At the same time the timer motor 114 will be energized as soon as the charging apparatus is set in operation, as the terminal 113 will be connected with the line wire 31 either through the conductor 112, the contacts 19 and the contacts on the switching element 17, or through the conductor 117 leading from the switching element 17, the bar 66 and the conductor 119, which leads to a connection with the conductor 112 and thus to the terminal 113. Thus the timer motor will be set in operation irrespective of the position of the switching element 17 when the bar 66 is connected across the terminals 116, 118 and 120.

When the battery is first connected with the charger, the charger is turned on by setting the time clock pointer to a predetermined time, this being usually about three hours, but will vary depending upon the size and type of battery that is being charged. The timer, however, does not start with this setting thereof because the circuit through the motor is not completed at this time when lead batteries are being charged. With Edison type batteries the charging time is set at from six to eight hours and the motor starts immediately upon the timer being set for the desired period of charging. The charging rate control member 25 has also been set to its desired position, preferably, before the timer is set or immediately thereafter. When this has been done the apparatus will function automatically to first charge the battery at the high rate until the desired voltage is reached, and then at the low rate. As soon as the timer is turned to "on" position, charging starts at the high rate, which is usually from three to four times the recommended finishing or low rate. Thus the charge may start at 100 amperes and as the charge in the battery progresses, the battery voltage begins to rise, adding resistance to the charging circuit, which causes the charger to taper somewhat in rate below the original 100 ampere rate. However, the charging continues at a relatively high rate until the battery reaches nearly full charge and starts to gas.

This gassing stage is reached at time intervals from the start of the charging operation that vary greatly, because in batteries that are used for such purposes as industrial lift trucks, for example, the battery may be almost completely discharged at the end of one day and on another day receive a very light discharge. Inasmuch as this great variation takes place, and the charging of batteries in industrial use is frequently under the control of employees that have no technical or mechanical training, it is necessary that the operation of the charger, insofar as switching from high rate charging to low rate charging is concerned, be automatic and fool proof. As heavy duty batteries, such as used industrially, are very expensive and must have a long life, the charge must be closely and accurately controlled. Temperature compensated relays which have been previously used are not accurate enough for this control.

The type of storage batteries above described will begin to gas when the voltage of each cell reaches 2.37 volts, or 14.22 volts, for a six cell or twelve volt lead battery. When the voltage across the terminals 55 and 58 reaches this point, the contacts 89 and 90 will engage due to movement of the movable member 88 of the voltmeter 83, causing the armature 100 of the relay having the winding 97 to be attracted, which will continue to be attracted due to the fact that when the contact is beween the contact members 101 and 104, the winding 97 will continue to be energized, thus keeping the contacts 102 and 105 in engagement, and the winding 108 continuously energized after the contacts 89 and 90 have once been engaged. This will cause the contacts on the switching member 17 to engage the contacts 19 and throw the resistance 9 into the circuit and also start the timer motor 114 to operate. The operation at the high charging rate will thus have been terminated and the charging at the low rate will have been initiated, and will continue until the timer motor 114 has operated for the time interval for which it was set, the low rate charging continuing until the motor has operated through the set time interval, whereupon the contact 37 will leave the contact 23 and the entire charging operation will be completed.

Thus extreme accuracy of the charging of the battery, no matter whether it is only partly or almost completely discharged, will be obtained, inasmuch as the low charging, the rate of which and the time interval of which both are controlled, starts with the battery at a definite charge. Undesirable heating and gassing of the battery, which would otherwise take place if the high charging rate were continued for too long a time, is thus avoided. Furthermore, the controlling means prevents the charger from returning to the high rate of charging after it has once been changed over to the low rate of charge, unless the battery were momentarily disconnected. Even if such disconnection took place and the battery were re-connected, the controlling member 83 would immediately start the successive operations, which would again switch the apparatus over to the low charging rate. In addition to this, my controlling system is not affected by wide differences in ambient temperature, because of the type of control used, and not in any manner affected by variations in resistance due to the charging operation itself, due to the fact that the voltage utilized for controlling the voltmeter 83 is derived directly from the battery terminals through its own set of conductors and not through any conductors that are used for the charging operation.

What I claim is:

1. The combination with apparatus for charging a storage battery at either a high rate or a low rate, of controlling means therefor terminating charging at said high rate and initiating charging at said low rate, comprising switching means having alternative positions one of which establishes a high rate charging circuit and the other of which establishes a low rate charging circuit, a winding for moving said switching means to said other position upon being energized, a voltmeter having a movable member responsive to the storage battery voltage, an actuating circuit for said switching means including a contact movable with said movable member, a stationary contact engaged thereby to close said actuating circuit upon said storage battery reaching a predetermined voltage, and a high resistance locking relay actuated and locked upon the closing of said actuating circuit, and switching means closed upon actuation of said relay to establish a circuit energizing said winding.

2. The combination with apparatus for charging a storage battery at either a high rate or a low rate, of controlling means therefor terminating charging at said high rate and initiating charging at said low rate, comprising switching means having alternative positions one of which establishes a high rate charging circuit and the other of which establishes a low rate charging circuit, a winding for moving said switching means to said other position upon being energized, a voltmeter having a movable member responsive to the storage battery voltage, an actuating circuit including a contact movable with said movable member, a stationary contact engaged thereby to close said actuating circuit upon said storage battery reaching a predetermined voltage, and a relay actuated upon the closing of said actuating circuit, and switching means closed upon actuation of said relay to establish a circuit energizing said winding and a circuit to maintain said relay in switch closing condition independently of said contacts.

3. The combination with apparatus for charging a storage battery at either a high rate or a low rate from an alternating current source, comprising a primary circuit connected with said source and including a primary transformer winding, and a secondary circuit including a secondary winding, said storage battery and a rectifier interposed between said secondary winding and battery, of means for controlling said charging by terminating charging at said high rate and initiating charging at said low rate, comprising a resistance, switching means movable into a position to insert said resistance in said primary circuit, a winding for moving said switching means into said position, a voltmeter of the suppressed zero type having a movable member responsive to the storage battery voltage, an actuating circuit for said switching means including a contact movable with said movable member, a stationary contact engaged thereby to close said actuating circuit upon said storage battery reaching a predetermined voltage, and a high resistance locking relay actuated and locked upon the closing of said actuating circuit, and switching means closed upon actuation of said relay to establish a circuit energizing said winding.

4. The combination with apparatus for charging a storage battery at either a high rate or a low rate, of controlling means therefor terminating charging at said high rate and initiating charging at said low rate, comprising switching means having alternative positions one of which establishes a high rate charging circuit and the other of which establishes a low rate charging circuit, a winding for moving said switching means to said other position upon being energized, a voltmeter having a movable member responsive to the storage battery voltage, an actuating circuit including a contact movable with said movable member and a stationary contact engaged thereby to close said actuating circuit upon said storage battery reaching a predetermined voltage, a relay having a high resistance winding in said actuating circuit and an armature providing a movable contact means engaging a pair of contacts upon energization of said high resistance winding, circuit connections establishing an energizing circuit for said first winding upon engagement of said movable contact means with said pair of contacts, and means establishing a shunt connection around said voltmeter upon attraction of said armature to maintain energization of said high resistance winding.

CHAS. B. BERG.

REFERENCES CITED

The following references are of record in the file of this patent:

UNITED STATES PATENTS

| Number | Name | Date |
|---|---|---|
| 1,852,799 | Cheeseman | Apr. 5, 1932 |
| 2,022,644 | Ashcraft | Dec. 3, 1935 |
| 2,096,440 | Wetzer | Oct. 19, 1937 |
| 2,102,141 | Wagar | Dec. 14, 1937 |
| 2,104,602 | Agnew et al. | Jan. 4, 1938 |
| 2,227,118 | Amsden | Dec. 31, 1940 |
| 2,272,745 | Hinds et al. | Feb. 10, 1942 |
| 2,347,542 | Amsden | Apr. 25, 1944 |